(12) United States Patent
Kalkunte et al.

(10) Patent No.: US 7,856,015 B2
(45) Date of Patent: *Dec. 21, 2010

(54) NETWORK SWITCH HAVING PORT BLOCKING CAPABILITY

(75) Inventors: Mohan Kalkunte, Sunnyvale, CA (US); Shekhar Ambe, San Jose, CA (US); Sam Sampath, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 345 days.

This patent is subject to a terminal disclaimer.

(21) Appl. No.: 11/790,906

(22) Filed: Apr. 27, 2007

(65) Prior Publication Data

US 2007/0201466 A1    Aug. 30, 2007

Related U.S. Application Data

(63) Continuation of application No. 09/953,881, filed on Sep. 18, 2001, now Pat. No. 7,227,862.

(60) Provisional application No. 60/234,172, filed on Sep. 20, 2000.

(51) Int. Cl.
*H04L 12/28* (2006.01)

(52) U.S. Cl. .................... 370/389; 370/392; 370/400; 370/401; 370/403; 370/404

(58) Field of Classification Search .......... 370/389, 370/392, 400, 401, 402, 403, 404
See application file for complete search history.

(56) References Cited

U.S. PATENT DOCUMENTS

| 5,278,789 | A | 1/1994 | Inoue et al. |
| 5,390,173 | A | 2/1995 | Spinney et al. |
| 5,414,704 | A | 5/1995 | Spinney |
| 5,423,015 | A | 6/1995 | Chung |
| 5,459,717 | A | 10/1995 | Mullan et al. |
| 5,473,607 | A | 12/1995 | Hausman et al. |
| 5,499,295 | A | 3/1996 | Cooper |
| 5,524,254 | A | 6/1996 | Morgan et al. |

(Continued)

FOREIGN PATENT DOCUMENTS

EP    0312917 A2    4/1989

(Continued)

OTHER PUBLICATIONS

"A High-Speed CMOS Circuit for 1.2-Gb/s16x16 ATM Switching," Alain Chemarin et al. 8107 IEEE Journal of Solid-State Circuits 27 (Jul. 1992), No. 7, New York, US, pp. 1116-1120.

(Continued)

*Primary Examiner*—Ayaz R Sheikh
*Assistant Examiner*—Andrew C Lee

(57) ABSTRACT

A switch is configured to block packets from being transmitted through designated ports. The switch has port bitmap generator configured to obtain a port bitmap and a table is configured to store a block mask indicating which port the packet should not be transmitted. A block mask lookup is configured to determine the block mask for the packet from the table, and a transmit port bitmap generator is configured to determine which ports the packet should be transmitted using the port bitmap and the block mask.

19 Claims, 4 Drawing Sheets

U.S. PATENT DOCUMENTS

| | | |
|---|---|---|
| 5,555,398 A | 9/1996 | Raman |
| 5,568,477 A | 10/1996 | Galand et al. |
| 5,579,301 A | 11/1996 | Ganson et al. |
| 5,644,784 A | 7/1997 | Peek |
| 5,652,579 A | 7/1997 | Yamada et al. |
| 5,696,899 A | 12/1997 | Kalwitz |
| 5,742,613 A | 4/1998 | MacDonald |
| 5,748,631 A | 5/1998 | Bergantino et al. |
| 5,781,549 A | 7/1998 | Dai |
| 5,787,084 A | 7/1998 | Hoang et al. |
| 5,790,539 A | 8/1998 | Chao et al. |
| 5,802,052 A | 9/1998 | Venkataraman |
| 5,802,287 A | 9/1998 | Rostoker et al. |
| 5,825,772 A | 10/1998 | Dobbins et al. |
| 5,828,653 A | 10/1998 | Goss |
| 5,831,980 A | 11/1998 | Varma et al. |
| 5,842,038 A | 11/1998 | Williams et al. |
| 5,845,081 A | 12/1998 | Rangarajan et al. |
| 5,887,187 A | 3/1999 | Rostoker et al. |
| 5,892,922 A | 4/1999 | Lorenz |
| 5,898,687 A * | 4/1999 | Harriman et al. ............ 370/390 |
| 5,909,686 A * | 6/1999 | Muller et al. ..................... 1/1 |
| 5,918,074 A | 6/1999 | Wright et al. |
| 5,940,596 A * | 8/1999 | Rajan et al. ................. 709/242 |
| 5,951,651 A * | 9/1999 | Lakshman et al. .......... 709/239 |
| 5,987,507 A | 11/1999 | Creedon et al. |
| 6,011,795 A | 1/2000 | Varghese et al. |
| 6,016,310 A * | 1/2000 | Muller et al. ................ 370/255 |
| 6,041,053 A | 3/2000 | Douceur et al. |
| 6,061,351 A | 5/2000 | Erimli et al. |
| 6,119,196 A | 9/2000 | Muller et al. |
| 6,128,296 A * | 10/2000 | Daruwalla et al. .......... 370/389 |
| 6,175,902 B1 | 1/2001 | Runaldue et al. |
| 6,185,185 B1 | 2/2001 | Bass et al. |
| 6,259,699 B1 * | 7/2001 | Opalka et al. ............... 370/398 |
| 6,411,599 B1 * | 6/2002 | Blanc et al. ................. 370/219 |
| 6,456,624 B1 * | 9/2002 | Eccles et al. ................ 370/400 |
| 6,570,884 B1 * | 5/2003 | Connery et al. ............. 370/419 |
| 6,574,231 B1 * | 6/2003 | Leung ......................... 370/412 |
| 6,658,002 B1 * | 12/2003 | Ross et al. ................... 370/392 |
| 6,667,984 B1 * | 12/2003 | Chao et al. .................. 370/414 |
| 6,724,759 B1 * | 4/2004 | Chang et al. ................ 370/389 |
| 6,778,547 B1 * | 8/2004 | Merchant ..................... 370/422 |
| 6,778,984 B1 * | 8/2004 | Lu et al. .......................... 707/4 |
| 7,042,885 B2 * | 5/2006 | Mahamuni et al. .......... 370/396 |
| 7,116,663 B2 * | 10/2006 | Liao ............................ 370/392 |

FOREIGN PATENT DOCUMENTS

| | | |
|---|---|---|
| EP | 0465090 A1 | 1/1992 |
| EP | 0 652 685 | 5/1995 |
| EP | 0752796 A2 | 1/1997 |
| EP | 0849917 A2 | 6/1998 |
| EP | 0853441 A2 | 7/1998 |
| EP | 0854606 A2 | 7/1998 |
| EP | 0859492 A2 | 8/1998 |
| EP | 0862349 A2 | 9/1998 |
| EP | 0907300 A2 | 4/1999 |
| EP | 0 961 443 | 12/1999 |
| FR | 2 725 573 A1 | 4/1996 |
| JP | 4-189023 | 7/1992 |
| WO | WO98/09473 | 3/1998 |
| WO | WO 99/00938 | 1/1999 |
| WO | WO 99/00939 | 1/1999 |
| WO | WO 99/00944 | 1/1999 |
| WO | WO 99/00945 | 1/1999 |
| WO | WO 99/00948 | 1/1999 |
| WO | WO 99/00949 | 1/1999 |
| WO | WO 99/00950 | 1/1999 |
| WO | WO9900936 A1 | 6/2001 |

OTHER PUBLICATIONS

"Local Area Network Switch Frame Lookup Technique for Increased Speed and Flecibility," 700 IBM Technical Disclosure Bulletin 38(Jul. 1995), No. 7, Armonk, NY, US, pp. 221-222.

"Queue Management for Shared Bugger and Shared Multi-buffer ATM Switches," Yu-Sheng Lin et al., Department of Electronics Engineering & Institute of Electronics, National Chiao Tung University, Hsinchu, Taiwan, R.O.C., Mar. 24, 1996, pp. 688-695.

"A 622-Mb/a 8x8 ATM Switch Chip Set with Shared Mutlibuffer Architecture," Harufusa Kondoh et al., 8107 IEEE Journal of Solid-State Circuits 28(Jul. 1993), No. 7, New York, US, pp. 808-814.

"Catalyst 8500 CSR Architecture," White Paper CP-002151999, Cisco Systems Inc. 1998, pp. 1-19.

"Computer Networks," A.S. Tanenbaum, Prentice-Hall Int., USA. CP-002147300(1998), Sec. 5.2-Sec. 5.3, pp. 309-320.

\* cited by examiner

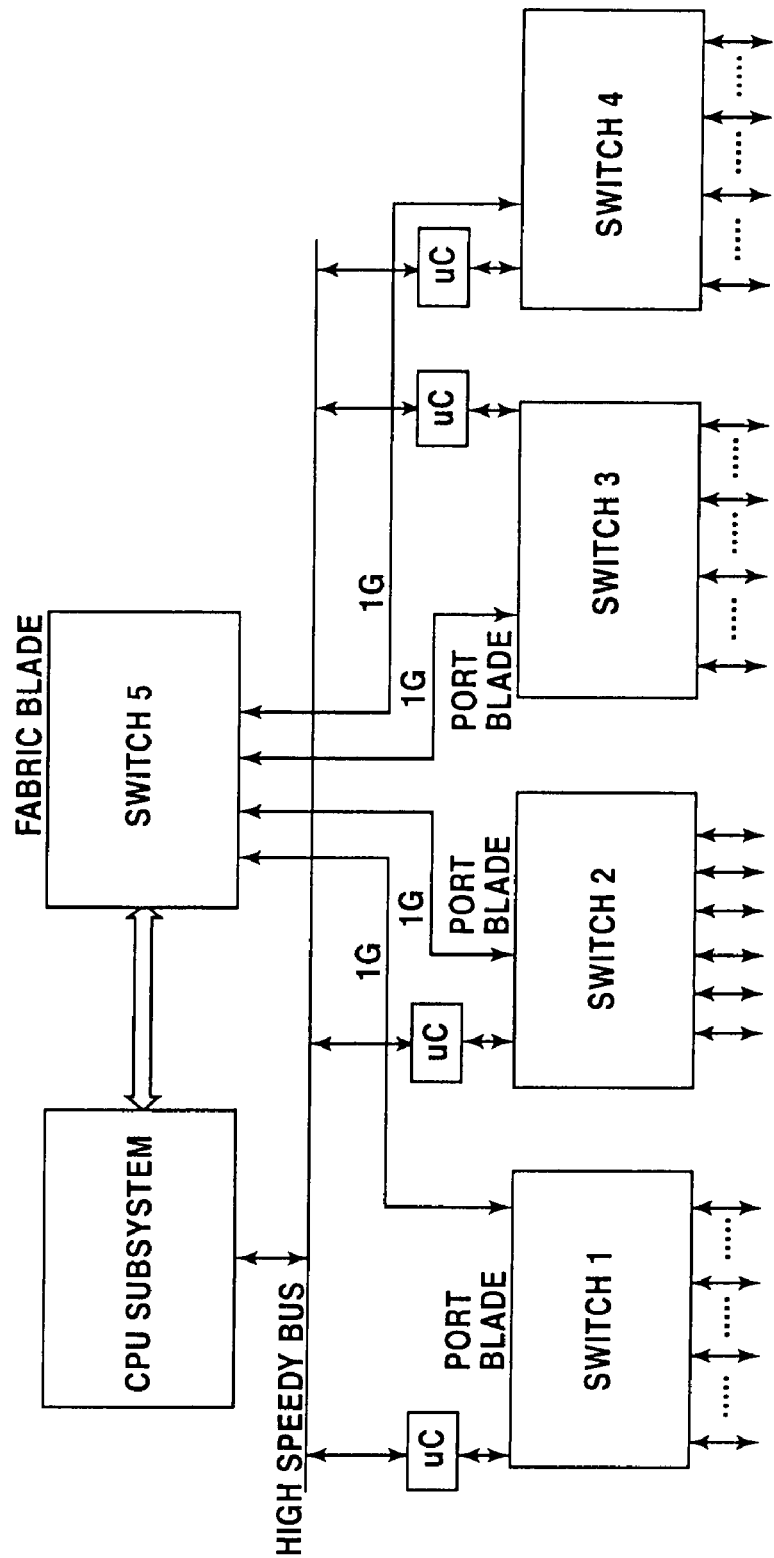

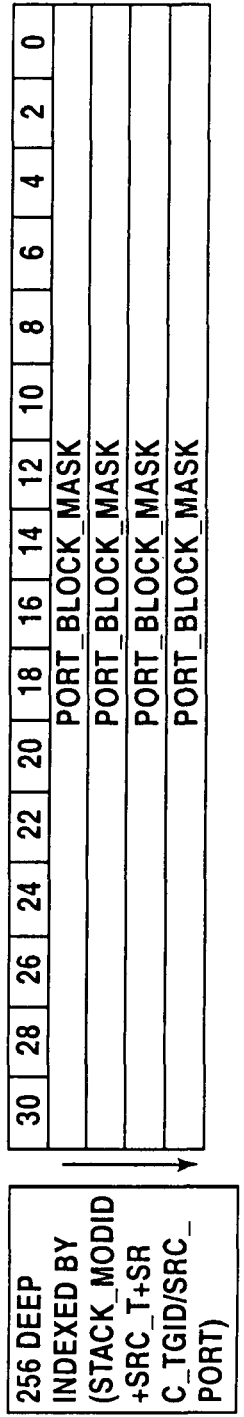

| (2b) | (1b) | (5b) |
|---|---|---|
| LOWER 2 BITS OF STACK_MODID | SRC_T | 00+3 BITS OF SRC_TGID |

| (2b) | (1b) | (5b) |
|---|---|---|
| LOWER 2 BITS OF STACK_MODID | SRC_T | 5 BITS OF SRC_PORT |

NETWORK SWITCH HAVING PORT BLOCKING CAPABILITY

REFERENCE TO RELATED APPLICATIONS

This application is a continuation of a U.S. application Ser. No. 09/953,881, filed Sep. 18, 2001, which claims priority to U.S. Provisional Patent Application Ser. No. 60/234,172 filed on Sep. 20, 2000. The contents of the provisional application identified above is hereby incorporated by reference.

BACKGROUND OF THE INVENTION

1. Field of the Invention

The invention relates to a method and apparatus for high performance switching in local area communications networks such as token ring, ATM, Ethernet, Fast Ethernet, and Gigabit Ethernet environments.

2. Description of the Related Art

As computer performance has increased in recent years, the demands on computer networks has significantly increased; faster computer processors and higher memory capabilities need networks with high bandwidth capabilities to enable high speed transfer of significant amounts of data. The well-known Ethernet technology, which is based upon numerous IEEE Ethernet standards, is one example of computer networking technology which has been able to be modified and improved to remain a viable computing technology. A more complete discussion of prior art networking systems can be found, for example, in SWITCHED AND FAST ETHERNET, by Breyer and Riley (Ziff-Davis, 1996), and numerous IEEE publications relating to IEEE 802 standards. Based upon the Open Systems Interconnect (OSI) 7-layer reference model, network capabilities have grown through the development of repeaters, bridges, routers, and, more recently, "switches", which operate with various types of communication media. Thickwire, thinwire, twisted pair, and optical fiber are examples of media which has been used for computer networks. Switches, as they relate to computer networking and to Ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network. Basic Ethernet wirespeed is up to 10 Megabits per second, Fast Ethernet is up to 100 Megabits per second, and Gigabit Ethernet is capable of transmitting data over a network at a rate of up to 1,000 Megabits per second. The newest Ethernet is referred to as 10 Gigabit Ethernet and is capable of transmitting data over a network at a rate of up to 10,000 Megabits per second. As speed has increased, design constraints and design requirements have become more and more complex with respect to following appropriate design and protocol rules and providing a low cost, commercially viable solution.

Referring to the OSI 7-layer reference model discussed previously, the higher layers typically have more information. Various types of products are available for performing switching-related functions at various levels of the OSI model. Hubs or repeaters operate at layer one, and essentially copy and "broadcast" incoming data to a plurality of spokes of the hub. Layer two switching-related devices are typically referred to as multiport bridges, and are capable of bridging two separate networks. Bridges can build a table of forwarding rules based upon which MAC (media access controller) addresses exist on which ports of the bridge, and pass packets which are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer three switches, sometimes referred to as routers, can forward packets based upon the destination network address. Layer three switches are capable of learning addresses and maintaining tables thereof which correspond to port mappings. Processing speed for layer three switches can be improved by utilizing specialized high performance hardware, and off loading the host CPU so that instruction decisions do not delay packet forwarding.

SUMMARY OF THE INVENTION

The present invention is, in one embodiment, drawn to a switch configured to block packets from being transmitted through designated ports. The switch can have a port bitmap generator configured to obtain a port bitmap and a table configured to store a block mask indicating which port the packet should not be transmitted. A block mask lookup can be configured to determine the block mask for the packet from the table, and a transmit port bitmap generator can be configured to determine which ports the packet should be transmitted to using the port bitmap and the block mask.

In another embodiment of the invention the switch may have a port bitmap generator means for obtaining a port bitmap, and a table storage means for storing a block mask indicating which port the packet should not be transmitted to. The switch may also have a block mask lookup means for determining the block mask for the packet from the table, and a transmit port bitmap generator means for determining which ports the packet should be transmitted using the port bitmap and the block mask.

In a further embodiment, the invention is a method for preventing packet from being sent to a port. The method may include the steps of receiving a packet in a port and determining a port bitmap indicating which ports the packet is to be sent out on. Then a block mask indicating which ports the packet is not to be sent out on is determined and the ports the packet should not be sent out on is determined using the port bitmap and the block mask.

BRIEF DESCRIPTION OF THE DRAWINGS

The objects and features of the invention will be more readily understood with reference to the following description and the attached drawings, wherein:

FIG. 1A is a block diagram of multiple switches connected to one another in accordance with one embodiment of the invention;

FIG. 2 is an illustration of a packet on a stack link according to the invention;

FIG. 3 is an illustration of a stack tag according to the invention;

FIG. 4 is an illustration of a PTABLE according to the invention;

DETAILED DESCRIPTION OF THE PREFERRED EMBODIMENTS

FIG. 1A is an illustration of one embodiment of the invention wherein a five blade switch chassis has four Port Blades and a Fabric Blade. Different configurations are possible. Each of the four Port Blades has connections for a switch to be used for inputs and outputs. As illustrated in FIG. 1A, Switch 1 occupies a first Port Blade, Switch 2 occupies a second Port Blade, Switch 3 occupies a third Port Blade, and Switch 4 occupies a fourth Port Blade.

Each of the Port Blades can have, as shown in FIG. 1A, a micro-controller. Each of the micro-controllers can be connected to a high speed bus and can be used to manage inputs and outputs associated with each of the switches, Switch 1, Switch 2, Switch 3 and Switch 4.

A fifth switch, Switch 5 can be connected to the Fabric Blade. The Fabric Blade as illustrated in FIG. 1A can be connected to a CPU. In this example, it can become necessary or desirable to send information such as control frames or control packets, also known as BPDUs, and all management traffic, to the CPU connected to the Fabric Blade. This can be accomplished by connecting each of the Switches on the Port Blades to the Fabric Blade through a stacking link and using a port steering feature of a Fast Filtering Processor (FFP). In the embodiment illustrated in FIG. 1A, each of the switches on the Port Blades, Switches 1, 2, 3 and 4, is connected to Switch 5 on the Fabric Blade through a Gigabit Port.

Figure 1B:
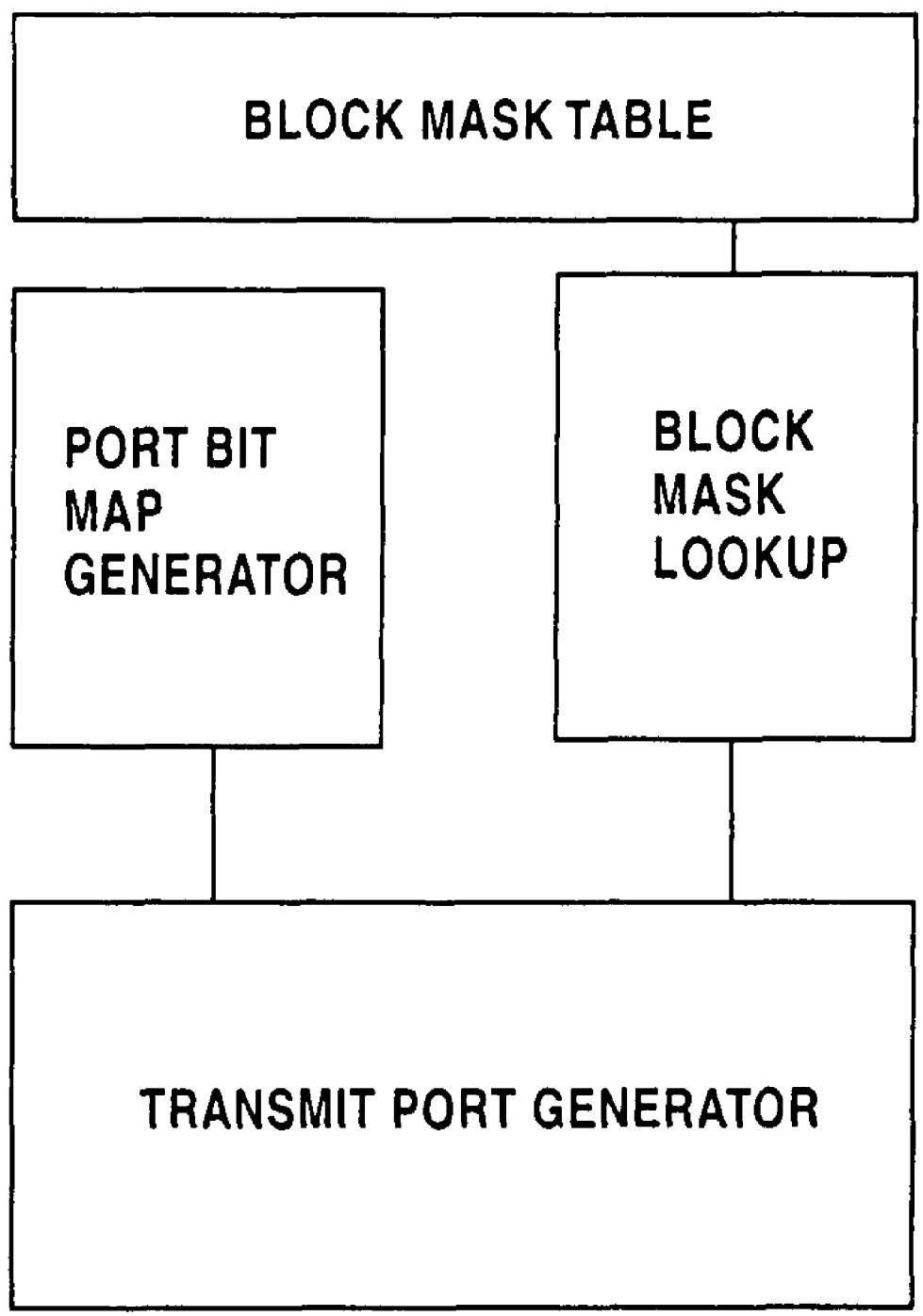
FIG. 1B is a block diagram of a switch having port blocking capability in accordance with one embodiment of the invention.

FIG. 1B is a block diagram of a switch having port blocking capability in accordance with one embodiment of the invention. The switch has a Block Mask Table. The Block Mask Table can have bitmaps of the ports in the switch where each bit represents a port in the switch. If a bit corresponding to a port is set then this can indicate that a packet can be transmitted to that port. Therefore if the bit is not set, the port is blocked and no packets should be transmitted to that port. Thus, the Block Mask Table can be used to indicate which ports a packet should and should not be sent to. A Block Mask Lookup is provided so that a bitmap from the Block Mask Table can be found. In one embodiment of the invention the bitmap in the Block Mask Table is looked up by the Block Mask Lookup based on which port the packet was sent from.

Each switch can also have a Port Bitmap Generator that generates a port bitmap of the switch to determine which port or ports a packet should be sent to. A port bitmap can for example be similar to the bitmaps of ports stored in the Block Mask Table. Each bit in the bitmap can correspond to a port in the switch. If a bit is set, this can indicate that the packet should be sent to the corresponding port. If the bit is not set the packet should not be sent to the port.

In order to determine if a packet should be sent to a specified port, a Transmit Port Generator can be provided which can receive bitmaps from the Port Bitmap Generator and the Block Mask Table through the Block Mask Lookup. The Transmit Port Generator can for example perform a logical AND between the bitmap from the Port Bitmap Generator and the bitmap from the Block Mask Table. If the result is a logical one then the packet should be sent to the designated port. Otherwise, the packet is not sent to the port.

For example, if a packet is not to be sent to port three of a switch, the bitmap from the Block Mask Table may be 11011111. The zero in the third bit indicates that the packet should not be sent to the third port. Now suppose in this example that the packet is to be sent to ports three, four, five and eight. The bitmap from the Port Bitmap Generator could be 00111001. The Transmit Port Generator can, in one embodiment of the invention, then perform a logical AND between the bitmap from the Block Mask Table (11011111) and the bitmap from the Port Bitmap Generator (00111001). The result of this logical AND would result in a bitmap of 00011001 and the packet will be sent to ports four, five and eight. It is noted that although the packet was supposed to be sent to port three of the switch, the packet was blocked from being sent to port three since the bitmap from the Block Mask Table had the third bit corresponding to port three set to zero.

FIG. 2 is an illustration of some of the fields of a packet on a stack link. The DA field can be used to indicate the destination address, the SA field can be used to indicate the source address, the VLAN Tag can be used to indicate if the packet is part of a Virtual Local Area Network (VLAN) and can indicate which VLAN the packet belongs to, the Stack Tag can be used to transmit useful information regarding a packet, and the Type/Len field can be used to indicate the length and/or type of the data field.

FIG. 3 is an illustration of a Stack Tag that can be utilized the present invention which contains useful information for a packet. In one embodiment of the invention the Stack Tag can contain information relevant to link aggregation or trunking, mirroring and/or port blocking.

Trunking refers to connecting multiple ports of a switch together to perform as a single switch having a wide bandwidth. For example if two eight port switches were trunked together using two of the ports for trunking purposes, six ports on each switch would be used as input/output ports and two ports on each switch would be identified as a single port to transmit information between the switches. Therefore, the two ports that a trunked together would act as a single ports having twice the bandwidth.

Mirroring is used to transmit information regarding activity taken place on a port on a switch to a Mirror-to-Port (MTP) on a switch. This function may be useful in monitoring activity on a port. For example, if it is desired to monitor a port on a switch, mirroring could be activated for the port. When mirroring is activated for this port, all activity taken place on the port is forwarded to the MTP and can be further analyzed.

Port Blocking can be used to block certain information from being transmitted to a port. For example, if students using a port in a school network setting should not have access to certain types of sensitive information, port blocking can be used to block the transfer of this sensitive information to specified ports.

The Stack Tag can be used to transmit valuable information in order to accomplish the above and other functions. Some examples of the fields of the Stack Tag are described below.

The Stack_Cnt field can be, for example, five bits long and indicates the number of hops the packet can go before it is deleted. The number of hops refers to the number of times the packet is transmitted from one switch to another switch.

The SRC_T field is shown in this example as being one bit long. If this bit is set then the source port is part of the trunk group.

The SRC_TGID field can be three bits long. This field identifies the trunk group if the SRC_T bit is set.

The SRC_RTAG field can be three bits long and identifies the trunk selection for the source trunk port.

The DST_T field can be one bit long and if this bit is set it indicates that the destination port is part of a trunk group.

The DST_TGID field can be three bits long and identifies the Trunk Group if the DST_T bit is set.

The DST_RTAG field can be three bits long. This field identifies the Trunk Selection Criterion if the DST_T bit is set.

The PFM field is two bits long and indicates the Port Filtering Mode for an ingress port.

The M field can be one bit long. If this bit is set, then this is a mirrored packet.

The MD field can be 1 bit long. If this bit is set and the M bit is set, then the packet is sent only to the mirrored-to-port. If this bit is not set and the M bit is set, then the packet is sent to the mirrored-to port (MTP) as well as the destination port (for ingress mirroring). If this bit is set and M bit is not set, then the packet is dropped without being mirrored.

The EM field is one bit long. This bit is set if and only if the packet has been forwarded by a module whose MTP is not the Stack link without being forwarded to MTP.

The ED field is one bit long. This bit is set if and only if the packet has been forwarded to a non-stack MTP.

The Stack_Modid field is five bits long. Each module in the Stack has an ID. The source module will insert its ID in this field when a packet is sent. This is mainly used for software to determine if a switch in the stack is down.

It is plain to a person of skill in the art that these field lengths, and the actions taken based on field status, are described above as examples only. Other lengths and actions are possible, within the scope of the invention.

The Stack Tag can be used to convey source port information on the Stacking ports. In one embodiment of the invention, when the packet arrives on a trunk port, the ingress logic appends the Stack Tag with the SRC_T field set and the SRC_TGID and the SRC_RTAG. However, when a packet arrives on a non-trunk port, the SRC_T is zero and the SRC_TGID and the SRC_RTAG are ignored or don't care fields.

During the ingress, when a packet arrives on a non-trunk port, the ingress logic writes the source port in the SRC_TGID and SRC_RTAG fields. Although the SRC_TGID and SRC_RTAG are three bit fields each, the combination totaling six bit fields, only the first five bits are needed. When the Fabric CPU receives a packet with a Stack Tag, if the SRC_T bit is zero then the SRC_TGID and SRC_RTAG fields are interpreted as the source port in order to determine where the packet should be sent.

FIG. 4 is an illustration of an example of a PTABLE of the present invention which could be a software or hardware table. The PTABLE could be predefined in the factory or be set up to be configured by an end user. In one embodiment of the invention, the PTABLE provides a per port bitmask used to define the set of egress ports that should be blocked for a specific ingress port. When a packet is received on an ingress port, the egress bitmap that is computed by the switch is ANDED with the bitmask to determine which ports the packet should be forwarded out on. In one embodiment of the invention the source port is passed in the Stack Tag.

The source port information can be passed in the same field as SRC_TGID and SRC_RTAG. When the SRC_T bit in the Stack Tag is set, the SRC_TGID field will indicate the source Trunk Group Identifier. Otherwise the SRC_TGID and SRC_RTAG fields will indicate the source port.

The PTABLE can be used as a STACKMASK Table for the Stacking Port. A STACKMASK Table can, in one embodiment of the invention, provide a per port bitmask used to define the set of egress ports that should be blocked for a specific ingress port when a packet is sent across the Stacking Port. This table can be 256 bits deep and 32 bits wide. The index to this table is Stack_modid+SRC_T+SRC_TGID/Src_Port. The Stack_modid, SRC_T, SRC_TGID, and Src_Port fields can be obtained from the Stack Tag. The return value, PORT_BLOCK_MASK, is a bitmask that indicates the set of egress ports that the packet should not be forwarded to. If the SRC_T bit is set then the index is Stack_modid+SRC_T+SRC_TGID. If the SRC_T bit is not set then the index is Stack_modid+SRC_T+Src_Port. Port Blocking across a stack of at least four devices can be provided by a table that is 256 bits deep and can be indexed by the Stack_Modid+SRC_T+SRC_TGID/Src_Port.

Figures 5A, 5B, 6:
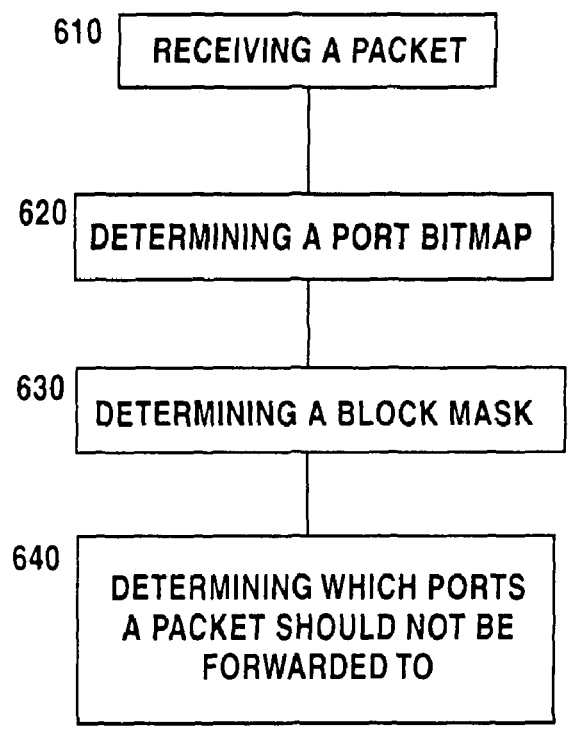
FIGS. 5A and 5B illustrate indexes for the PTABLE according to the invention.
FIG. 6 is flow diagram of the steps which can be used in port blocking according to one embodiment of the invention.

The index of the table is calculated as illustrated in FIG. 5A when the SRC_T bit in the Stack Tag is set. In this example the lower 2 bits of the Stack_Modid are used for two bits of the index and the SRC_T is used as a bit of the index. Finally, two zeros are appended to the three bits SRC_TGID for five bits of the index.

The index of the table is calculated as illustrated in FIG. 5B when the SRC_T bit in the Stack Tag is not set. The lower 2 bits of the Stack_Modid are used for two bits of the index and the SRC_T is used as a bit of the index. Finally, five bits of the Src_Port are used for five bits of the index.

FIG. 6 is a flow diagram of steps taken, in one embodiment of the invention, to prevent a packet from being sent to a port. The first step 610 is to receive a packet in the ingress of a port. Initially when a packet is received in the ingress of a port, address resolution (ARL) is performed on the packet.

In step 620, an ARL can be performed on the packet to determine a Port Bitmap that indicates all the ports that the packet has to be forwarded to. In step 630 a Block Mask is determined to indicate which ports the packet should not be forwarded to. For example, a table as illustrated in FIG. 4 can be used to determine a PORT_BLOCK_MASK for a packet.

In step 640 the Port Bitmap can be logically ANDED with the PORT_BLOCK_MASK in order to determine a Port Bitmap indicating which ports the packet should not be forwarded to. This Port Bitmap can be determined before the processing enters the FFP and Mirroring logic. If the packet is tagged, the logic will pick up the PORT_BLOCK_MASK for the ingress port and a VLAN bitmap from a VTABLE. This will allow the packet to be blocked on the ports in the local device. When the packet arrives on a stack port, it will go through the ARL logic to obtain the Port Bitmap for the current device. The PORT_BLOCK_MASK for the stacking port is obtained by indexing the STACKMASK table with the Src_Modid+SRC_T+Src_Port obtained form the Stack Tag. The Port Bitmap is ANDED with the bitmask. This will allow the packet to be blocked on the current device based on the ingress of another device.

In this example, the following packets can go to the CPU independent of the PORT_BLOCK_MASK for the CPU port:

1) BPDUs
2) VLAN miss, VID=0xfff (if C_DROP is not set)
3) Entry in the ARL Table with C bit set
4) L2 Station movement on a static entry in the ARL table
5) CML=1 in the PTABLE
6) CPU Bit in the PTABLE Port blocking has the following effects in mirroring behavior. If a packet is ingress mirrored and the packet is not forwarded to the destination port because of port blocking, the packet is still sent to the MTP. If a known unicast packet is not forwarded to an egress port because of port blocking and that port is egress mirrored, the packet is not sent to the MTP. If multiple egress ports are mirrored, and there is at least one egress port that is not blocked, then the packet will be sent to the MTP.

In order to enable stacking, the bit in the PORT_BLOCK_MASK corresponding to the stack port should be set to one. All ports of a trunk group should either be blocked or not blocked.

The FFP can effectively steer a packet that was blocked from going to one port to another port. However, the port that the packet is steered to should not be blocked. Therefore the FFP should be programmed not to conflict with port blocking.

The above-discussed configuration of the invention is, in one embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, and/or a corroboration of hardware and software components, thereby taking advantage of the functional aspects of the invention without maximizing the advantages through the use of a single semiconductor substrate.

Although the invention has been described based upon these preferred embodiments, it would be apparent to those of skilled in the art that certain modifications, variations, and alternative constructions would be possible, while remaining within the spirit and scope of the invention. In order to determine the metes and bounds of the invention, therefore, reference should be made to the appended claims.

We claim:

1. A switch configured to block a packet from being transmitted through at least one designated port, said switch comprising:
    a block mask lookup configured to determine a block mask that indicates any designated ports to which the packet is blocked from being transmitted;
    a port bitmap generator configured to generate, independently of the block mask, a port bitmap indicating which port(s) the packet would be transmitted to if no ports were blocked; and
    a transmit port bitmap generator configured to determine which ports the packet should be transmitted using the port bitmap and the block mask.

2. The switch as recited in claim 1, wherein said transmit port bitmap generator is configured to execute a logical AND between the port bitmap and the block mask.

3. The switch as recited in claim 1, wherein the port bitmap generator is configured to perform address resolution to determine the port bitmap.

4. The switch as recited in claim 1, further comprising: a table configured to store the block mask, wherein each block mask of the table is indexed using a source port identification.

5. A switch configured to block packets from being transmitted through designated ports, said switch comprising:
    a block mask lookup means for determining a block mask that indicates any designated ports to which the packet is blocked from being transmitted;
    a port bitmap generator means for generating, independently of the block mask, a port bitmap indicating which port(s) the packet would be transmitted to if no ports were blocked; and
    a transmit port bitmap generator means for determining which ports the packet should be transmitted using the port bitmap and the block mask.

6. The switch as recited in claim 5, wherein said transmit port bitmap generator means executes a logical AND between the port bitmap and the block mask.

7. The switch as recited in claim 5, wherein the port bitmap generator means further for performing address resolution (ARL) logic to determine the port bitmap.

8. The switch as recited in claim 5, further comprising: table storage means for storing the block mask, wherein the table storage means is configured to index the block mask using a source port identification.

9. A method for preventing a packet from being sent to a port of a networking apparatus, said method comprising:
    determining a port block mask indicating which ports of the networking apparatus a received packet is not to be sent out on;
    determining, independently of the port block mask, a port bitmap indicating which port(s) the packet would be sent out on if not for the port block mask;
    determining blocked ports indicating which ports the received packet should not be sent out on using the port bitmap and the block mask; and
    preventing the received packet from being sent out on the blocked ports.

10. The method as recited in claim 9, wherein determining blocked ports indicating which ports the received packet should not be sent out on further comprises performing a logical AND between the port bitmap and the block mask.

11. The method as recited in claim 9, wherein the determining the port bitmap comprises:
    stripping a stack tag from the packet; and
    performing address resolution on the stack tag.

12. The method as recited in claim 9, wherein determining a port block mask further comprises reading the port block mask from a table indexed using a source port identification of the packet.

13. A system configured to block at least one packet from being transmitted through designated ports, said system comprising:
    a port bitmap generator configured to generate a port bitmap, wherein the port bitmap indicates which port(s) the packet would be transmitted to if no ports were designated;
    a table configured to store the block mask indicating any designated ports to which the packet should not be transmitted;
    a block mask lookup module configured to determine the block mask for the packet from said table; and
    a transmit port bitmap generator configured to determine which ports the packet should be transmitted using the port bitmap and the block mask.

14. The system of claim 13, wherein said transmit port bitmap generator is configured to execute a logical AND between the port bitmap and the block mask.

15. The system of claim 13, wherein said port bitmap generator is configured to perform address resolution to determine the port bitmap.

16. The system of claim 13, wherein each block mask of the table is indexed using a source port identification.

17. A system, comprising:
    a table storage means for storing a block mask indicating which port a packet should not be transmitted;

a port bitmap generator configured to generate a port bitmap, wherein the port bitmap indicates which port(s) the packet would be transmitted to if no ports were designated as blocked; and a transmit port bitmap generator means for determining which ports the packet should be transmitted using the port bitmap and the block mask, wherein said table storage means indexes the block mask using a source port identification.

18. The system of claim 17, wherein said transmit port bitmap generator means is configured to execute a logical AND the port bitmap and the block mask.

19. The system of claim 17, wherein said port bitmap generator means is configured to perform address resolution (ARL) logic to determine the port bitmap.

\* \* \* \* \*

UNITED STATES PATENT AND TRADEMARK OFFICE
CERTIFICATE OF CORRECTION

PATENT NO. : 7,856,015 B2
APPLICATION NO. : 11/790906
DATED : December 21, 2010
INVENTOR(S) : Mohan Kalkunte et al.

It is certified that error appears in the above-identified patent and that said Letters Patent is hereby corrected as shown below:

In column 10, line 3, in claim 18, after "AND" insert -- between --.

Signed and Sealed this
Fourteenth Day of June, 2011

David J. Kappos
*Director of the United States Patent and Trademark Office*